US012025028B2

(12) United States Patent
Mardjono et al.

(10) Patent No.: US 12,025,028 B2
(45) Date of Patent: Jul. 2, 2024

(54) BLADE FOR A TURBOMACHINE AND METHOD FOR THE MANUFACTURE THEREOF

(71) Applicants: SAFRAN AIRCRAFT ENGINES, Paris (FR); INSTITUTUL NATIONAL DE CERCETARE-DEZ-VOLTARE TURBOMOTOARE—COMOTI, Bucharest (RO)

(72) Inventors: Jacky Novi Mardjono, Moissy-Cramayel (FR); Norman Bruno André Jodet, Moissy-Cramayel (FR); Radu Mihalache, Bucharest (RO); Romulus Petcu, Bucharest (RO); Valentin Silivestru, Bucharest (RO); Cristian Mihail Stanica, Ilfov (RO); Lucia Raluca Voicu, Bucharest (RO)

(73) Assignees: SAFRAN AIRCRAFT ENGINES, Paris (FR); INSTITUTUL NATIONAL DE CERCETARE-DEZ-VOLTARE TURBOMOTOARE—COMOTI, Bucharest (RO)

( * ) Notice: Subject to any disclaimer, the term of this patent is extended or adjusted under 35 U.S.C. 154(b) by 400 days.

(21) Appl. No.: 16/641,139

(22) PCT Filed: Aug. 21, 2018

(86) PCT No.: PCT/FR2018/052083
§ 371 (c)(1),
(2) Date: Feb. 21, 2020

(87) PCT Pub. No.: WO2019/038500
PCT Pub. Date: Feb. 28, 2019

(65) Prior Publication Data
US 2021/0140319 A1     May 13, 2021

(30) Foreign Application Priority Data

Aug. 24, 2017 (FR) .................................. 1757865
Aug. 24, 2017 (FR) .................................. 1757867
Aug. 29, 2017 (FR) .................................. 1757955

(51) Int. Cl.
*F01D 5/14* (2006.01)
*B29C 70/34* (2006.01)
(Continued)

(52) U.S. Cl.
CPC ............ *F01D 5/147* (2013.01); *B29C 70/345* (2013.01); *B29C 70/462* (2013.01);
(Continued)

(58) Field of Classification Search
CPC .......... F01D 5/147; F01D 5/282; F01D 9/042; F05D 2220/323; F05D 2300/614;
(Continued)

(56) References Cited

U.S. PATENT DOCUMENTS 3,028,292 A    4/1962   Hinds
4,213,739 A    7/1980   Euler et al.
(Continued)

FOREIGN PATENT DOCUMENTS

DE    26 09 006 A1   9/1977
DE    91 15 292 U1   2/1992
(Continued)

OTHER PUBLICATIONS

Official Communication dated Apr. 11, 2018, in FR Application No. 1757865 (3 pages).
(Continued)

*Primary Examiner* — S. Behrooz Ghorishi
(74) *Attorney, Agent, or Firm* — Bookoff McAndrews, PLLC

(57) ABSTRACT

A manufacturing method of a turbomachine airfoil, such as an outlet guide vane airfoil, comprising positioning a first
(Continued)

fibrous wall preform on a first mold portion, placing at least one core on the first wall preform, positioning a second fibrous wall preform on the core, assembling a second mold portion to the first mold portion so as to form a mold around the first and second wall preforms, applying a hardening treatment to the first and second wall preforms, removing the core, and positioning a reinforcing structure between the first wall preform and the second wall preform.

19 Claims, 8 Drawing Sheets

(51) Int. Cl.
| | | |
|---|---|---|
| *B29C 70/46* | (2006.01) | |
| *B29C 70/70* | (2006.01) | |
| *B29K 105/08* | (2006.01) | |
| *B29K 307/04* | (2006.01) | |
| *B29L 31/08* | (2006.01) | |

(52) U.S. Cl.
CPC .......... *B29C 70/465* (2013.01); *B29C 70/467* (2013.01); *B29C 70/70* (2013.01); *B29K 2105/0845* (2013.01); *B29K 2307/04* (2013.01); *B29L 2031/082* (2013.01); *F05D 2220/323* (2013.01); *F05D 2300/614* (2013.01)

(58) Field of Classification Search
CPC . F05D 2260/31; B29C 70/345; B29C 70/462; B29C 70/465; B29C 70/467; B29C 70/70; B29K 2105/0845; B29K 2307/04; B29L 2031/082; B29D 99/0028; Y02T 50/60
See application file for complete search history.

(56) References Cited

U.S. PATENT DOCUMENTS

| | | |
|---|---|---|
| 4,316,700 A | 2/1982 | Schramm |
| 5,392,514 A | 2/1995 | Cook et al. |
| 6,227,805 B1 | 5/2001 | Besse et al. |
| 6,431,837 B1 | 8/2002 | Velicki |
| 2010/0086408 A1 | 4/2010 | Koike |
| 2012/0091627 A1* | 4/2012 | Schibsbye ............. F03D 1/0675 264/258 |
| 2014/0023512 A1* | 1/2014 | Pilpel ...................... F03D 3/062 416/226 |
| 2016/0161121 A1 | 6/2016 | Chang |
| 2016/0346995 A1* | 12/2016 | Butler .................. B29C 66/131 |
| 2016/0348642 A1* | 12/2016 | Hayden ................ B29C 70/304 |

FOREIGN PATENT DOCUMENTS

| | | |
|---|---|---|
| DE | 10 2013 100 053 A1 | 7/2014 |
| DE | 10 2014 204 743 A1 | 9/2015 |
| EP | 0 057 621 A2 | 8/1982 |
| EP | 0 561 590 A1 | 9/1993 |
| EP | 2 377 674 A1 | 10/2011 |
| EP | 2 789 827 A1 | 10/2014 |
| EP | 2 806 107 A1 | 11/2014 |
| EP | 3 059 390 A1 | 8/2016 |
| EP | 3 098 439 A1 | 11/2016 |
| FR | 2 974 225 A1 | 10/2012 |
| FR | 3 032 753 A1 | 8/2016 |
| GB | 846 623 A | 8/1960 |
| WO | WO 2010/024736 A1 | 3/2010 |
| WO | WO 2015/108658 A1 | 7/2015 |

OTHER PUBLICATIONS

Official Communication dated Mar. 27, 2018, in FR Application No. 1757867 (2 pages).

Official Communication dated May 2, 2018, in FR Application No. 1757955 (2 pages).

International Search Report issued in International Application No. PCT/FR2018/052083 dated Dec. 6, 2018, with English translation (6 pages).

* cited by examiner

BLADE FOR A TURBOMACHINE AND METHOD FOR THE MANUFACTURE THEREOF

CROSS REFERENCE TO RELATED APPLICATIONS

This application is the U.S. national phase entry under 35 U.S.C § 371 of International Application No. PCT/FR2018/052083, filed on Aug. 21, 2018, which claims priority to French Patent Application No. 1757865, filed on Aug. 24, 2017, French Patent Application No. 1757867, filed on Aug. 24, 2017, and French Patent Application No. 1757955, filed on Aug. 29, 2017.

FIELD OF THE INVENTION

The present disclosure relates to the airfoils of gas turbines, and more particularly to a method for manufacturing an airfoil for a turbomachine, such as an outlet guide vane airfoil, as well as an airfoil of this type. Such an airfoil may be employed in an aircraft turbomachine.

TECHNOLOGICAL BACKGROUND

In fields such as aeronautics, lightening machines is a constant concern of manufacturers. For example, in airplane engines, it is known to replace some metal vanes by vanes made of composite materials, which have the advantage of being lighter.

However, composite vanes break more easily than metal vanes when they are subjected to strains. Now certification authorities require engines to reasonably resist certain sizing faults such as the loss of a fan airfoil or the ingestion of a medium-sized bird. In particular, these faults induce movements of the motor casing which strongly load the outlet guide vanes (hereafter OGV) situated in the cooling stream, just downstream of the fan.

Thus, at present, it is not possible to replace conventional metal OGVs by composite vanes because the latter would not adequately resist the imposed displacements occurring during this type of fault.

There is therefore a need for a new type of turbomachine vane.

PRESENTATION OF THE INVENTION

To this end, the present disclosure relates to a manufacturing method for a turbomachine airfoil, such as an outlet guide vane airfoil, comprising the following steps:
 positioning a first fibrous wall preform on a first mold portion;
 placing at least one core on the first wall preform;
 positioning a second fibrous wall preform on the core;
 assembling a second mold portion to the first mold portion so as to form a mold around the first and second wall preforms;
 applying a hardening treatment to the first and second wall preforms;
 removing the core;
 positioning a reinforcing structure between the first wall preform and the second wall preform.

A turbomachine vane general comprises a root and an airfoil extending from the root, the airfoil being the contoured portion of the vane, the role of which is essentially aerodynamic.

A wall preform is a preform intended to form, at the end of the manufacturing method, one wall of the airfoil. Hereafter, "the" or "a" wall preform designates, depending on the context, the first or the second wall preform, generally each of the wall preforms.

The wall preform, or more simply the preform, is fibrous in that it comprises fibers, for example in the form of one or more sheets each comprising one or more superimposed plies, a ply being a two-dimensional assembly of fibers. The preform may be pre-impregnated or impregnated subsequently, so as to form a composite material. The matrix of said material, which surrounds the fibers, may in particular be an organic, polymer or plastic resin.

The first and the second preforms may have one or more sheets in common, said sheets then having a portion belonging to the first preform and a portion belonging to the second preform.

The core is an element inserted between the first and second preform and forming a backing mold intended to define the interior shape of the airfoil. Thus the formed airfoil, after having removed the core, is at least partly hollow. The core may be a form with a fixed shape or a core with an adaptable shape, inflatable for example, which allows exerting a predetermined pressure on the inside of the airfoil.

The intersection between the first wall preform and the second wall preform may form the leading edge and/or the trailing edge of the airfoil. The reinforcing structure may be arranged at a distance from the leading edge and/or the trailing edge.

The reinforcing structure may be arranged on the first wall preform at the same time as the core, in which case the reinforcing structure defines, jointly with the core, the internal shape of the airfoil. Alternatively, the reinforcing structure may be inserted between the first wall preform and the second wall preform after having removed the core, in which case the reinforcing structure may be inserted into the volume left free by the core. The core may be withdrawn or destroyed in place.

The hardening treatment may comprise heat treatment, typically a rise in temperature. For example, when the preforms are pre-impregnated, such a heat treatment allows fluidizing the material with which the fibers are pre-impregnated, so as to cause it to form a matrix around said fibers, then baking it until it is hardened. According to another example, particularly when the preforms are not pre-impregnated, the hardening treatment may comprise the injection of a matrix around the fibers, the hardening of the matrix then allowing maintaining the shape of the fibers, hence hardening the preform.

Due to its composite nature and its at least partly hollow geometry, the airfoil thus formed is particularly lightweight, which allows reducing the fuel consumption of the engine and its pollutant emissions. In addition, the reinforcing structure provides longitudinal flexibility to the airfoil and allows it to adequately resist the imposed displacements occurring during sizing faults, in particular the loss of a fan airfoil. Moreover, this method may be implemented by means of an autoclave, which not only allows producing an airfoil of which the constituents have a high density and high compactness and are optimized as regards the orientation of the fibers, but also simultaneously producing a series of several airfoils within the same production cycle.

In some embodiments, the manufacturing method comprises the insertion of a leading edge stiffener and/or a trailing edge stiffener before applying the hardening treatment. Hereafter, "the" or "a" stiffener designates, depending on the context, the trailing edge stiffener and/or the leading edge stiffener, or more generally each of these stiffeners. The stiffener may be situated at the intersection between the first preform and the second preform. The stiffener is intended to stiffen, respectively, the leading edge and/or the trailing edge of the airfoil. More precisely, due to the stiffener, the natural frequencies of the airfoil can be moved away from the range of critical frequencies which are generated during sizing faults.

In some embodiments, the leading edge stiffener and/or the trailing edge stiffener comprise, before applying the hardening treatment, a coiled fibrous preform. The fibrous preform may be coiled around a support or over itself. The fibrous preform may, for example, form a tube prior to the application of the hardening treatment. The fibrous reinforcement may comprise one or more sheets, in particular a single layer sheet comprising a single ply. The fibrous preform may be pre-impregnated, possibly with the same matrix as the wall preforms. The stiffener may also change its shape during the hardening treatment.

In some embodiments, the reinforcing structure is arranged between the first wall preform and the second wall preform after the application of the hardening treatment, and a second hardening treatment is applied to harden the reinforcing structure. In these embodiments, the hardening treatment (first hardening treatment) is intended essentially to harden the first and second wall preforms. The reinforcing structure is inserted between said wall preforms afterward, and is hardened in turn by means of the second hardening treatment. These embodiments allow the first hardening treatment to be carried out more simply, without having to take the reinforcing structure into account.

In some embodiments, before the reinforcing structure is subjected to any of the hardening treatments, the reinforcing structure comprises a coiled fibrous preform. The fibrous preform may be coiled around a support or over itself. The fibrous preform may, for example, form a tube before applying the hardening treatment. The preform may comprise one or more sheets, in particular a single-layer sheet comprising a single ply. The reinforcing structure may comprise several fibrous preforms, in particular one or more such tubes, possibly assembled together. According to one example, the reinforcing structure may comprise at least three tubes forming an H-shaped structure, for example extending longitudinally in the airfoil. The reinforcing structure may change shape during the hardening treatment that it undergoes.

In some embodiments, after the reinforcing structure has been subjected to any of the hardening treatments, the reinforcing structure is in contact with a first wall formed from the first wall preform and/or a second wall formed from the second wall preform. It is understood that said hardening treatment occurs when the reinforcing structure is arranged between the first and the second wall, so as to create a connection between the reinforcing structure and at least one of the wall preforms, in particular via the interpenetration of the matrices.

In some embodiments, the first wall preform comprises a first portion of a fiber sheet, the second wall preform comprises a second portion of the same fiber sheet, said sheet forming, at the intersection between the first and second wall preforms, the leading edge or the trailing edge of the airfoil. Thus there is structural continuity between the first and second wall preforms, which improves the strength of the airfoil. In addition, the leading edge and the trailing edge, which are more heavily loaded zones, are particularly reinforced.

In some embodiments, the first wall preform and/or the second wall preform comprise a plurality of mutually overlapping fiber sheets. The plurality of sheets allows reinforcing the most heavily loaded portions of the airfoil while also lightening the least loaded, and facilitating the manufacture of the sheets. Due to the fact that the sheets overlap, the stresses are adequately transmitted to the interior of the preform of the wall in question.

The present disclosure also relates to a composite airfoil for a turbomachine, such as an outlet guide vane airfoil, comprising a first wall having a fibrous reinforcement, a second wall having a fibrous reinforcement, and a reinforcing structure disposed between the first wall and the second wall. The airfoil may be produced by means of the previously described method and have one or more of the properties previously described.

In some embodiments, the airfoil comprises a leading edge stiffener and/or a trailing edge stiffener, at the intersection between the first wall and the second wall.

Moreover, the present disclosure relates to an insert for the attachment of a component on a turbomachine support, the insert being configured to be assembled to the component and to the support and comprising a socket configured to receive an attachment member, and at least one fin protruding transversely from the socket.

A turbomachine support is a support that may be used in a turbomachine. Moreover, within the meaning of the present disclosure, the insert, or the socket, extends along one axis overall. The axial direction corresponds to the direction of the axis of the insert and a radial direction is a direction perpendicular to this axis and crossing this axis. Likewise, an axial plane is a plane containing the axis of the insert and a radial or transverse plane is a plane perpendicular to this axis. A circumference is understood to be a circle belonging to a radial plane and the center of which belongs to the axis of the insert. A tangential or circumferential direction is a direction tangent to a circumference; it is perpendicular to the axis of the insert but does not pass through the axis.

Unless the contrary is stated, in this context, the adjectives inner and outer are used with reference to a radial direction so that the inner portion of an element is, in a radial direction, closer to the axis of the insert than the outer portion of the same element.

The fin may be a circumferentially delimited flange portion; the fin does not go completely around the socket. The fin may have the general shape of a plate or a sheet, plane or curved. The fin may extend substantially in a transverse plane.

The socket may be configured to receive an attachment member. In these cases, the attachment member may be integral with the socket and/or formed permanently with the socket. The attachment member may also be separate from the socket. The attachment member, possibly integrated with the socket, allows the attachment of the component to the support via the insert and more particularly via the socket.

The insert may be assembled directly or indirectly to the component and to the support. According to one example, the insert may be assembled directly to the component, for example embedded in the component, or assembled indirectly to the support, for example by means of the attachment member. According to one variant, the component and the support may be interchanged in the preceding example.

Due to the fact that the insert comprises a socket and a fin protruding transversely from the socket, the insert may serve as an attachment intermediary between the component and the support. The fin allows reinforcing the connection between the component and the support in the vicinity of the socket, to compensate the possible breakage of the component or of the support by deformation of the fin and to displace the critical zone of the socket toward the distal end of the fin. Thus, due to the fin, the component resists better the displacements that are imposed on it by the support and vice versa.

In the case of an aircraft turbomachine, such an insert, assembled to an OGV made of composite material, is therefore capable of ensuring the strength of the OGV in response to the displacements imposed by the casing on which the OGV is fixed, said casing forming a turbomachine support.

In some embodiments, the socket comprises at least two sections with substantial axial symmetry and with different outside diameters, the sections being assembled together in an axial direction of the socket. The axis of symmetry of the two sections is preferably the axis of the socket, preferably identical with the axis of the insert. The result is better axial integration of the inset in the component and/or the support.

In some embodiments, the socket comprises an inner tapped portion and the attachment member comprises a threaded rod. Thus the inner tapped portion is configured to cooperate with a threaded rod of the attachment member. The attachment between the component and the support may therefore be disassembled. Alternatively, the attachment member may form an attachment which cannot be disassembled and may be, for example, a rivet, a pin, a snap-fitting member, etc.

In some embodiments, the fin has a decreasing axial thickness from the socket to the distal end of the fin. This allows providing an appropriate transition between the structure of the insert and the structure of the component. According to one example, said thickness may decrease in steps: in this case, the fin may have at least two fin segments, each with a constant axial thickness, the thickness of each fin segment being strictly smaller than the thickness of the adjoining fin segment on the socket side.

In some embodiments, the fin extends circumferentially between two mutually parallel tangents to the socket. Thus, the transverse bulk of the socket is limited and the socket may be judiciously oriented so that the fin is effective only in certain directions. Optionally, the fin may extend continuously between said two tangents. Optionally, the fin may occupy the entire interval between said two tangents.

In some embodiments, the insert is made of metal. This term encompasses metal alloys.

The present disclosure also relates to an assembly for turbomachines comprising a component and an insert as previously described, the insert being assembled to the component.

In some embodiments, the component is made of a composite material having a fibrous reinforcement in the form of plies, and the fin is retained, on either side in an axial direction, between certain of said plies. Thus, the insert is integrated with the component and the fin allows good anchorage of the insert in the component. This translates into a better distribution of forces within the component in the event of an incident, hence in a reduction of the stresses to which the component is subjected.

In some embodiments, the insert is provided on one side of the component and the fin extends to an opposite side of the component. The fin is therefore directed toward the inside of the component and allows better accommodation of the displacements between the support, where the displacements are imposed, and the inside of the component which, as such, may poorly resist the imposed displacements.

In some embodiments, the component is a turbomachine vane. The component may be an OGV. Thus, according to one example, the insert may form an attachment interface between an OGV made of composite material and a metal casing, the insert accommodating, by its deformation and in particular the deformation of the fin, the displacements imposed by the casing, which the OGV could not resist otherwise.

In some embodiments, the vane comprises at least one platform and an airfoil extending from the platform, and the insert is housed in the platform. Thus, the attachment of the insert to the turbomachine support, generally a casing, is easy.

The platform is preferably made in a single piece with the airfoil. More particularly, when the fin is retained, on either side in an axial direction, between certain plies of the composite vane, said plies preferably extend continuously from the platform to the airfoil. Thus the distribution of the stresses in the vane is optimal.

Alternatively, the component may be a protection panel, made for example of composite material, for example an acoustic panel.

The present disclosure also relates to an assembly comprising a turbomachine support and an insert as previously described, assembled to the support. This assembly may have all or part of the features described previously with reference to the assembly comprising the component and the insert, mutatis mutandis.

Moreover, the present disclosure relates to an insert for the attachment of a component to a turbomachine support, the insert being configured to be assembled to the component and to the support and comprising a socket configured to receive an attachment member, the socket comprising a tubular first wall and a second wall arranged around at least one portion of the first wall, the second wall having a first end connected to the first wall and a free second end.

A turbomachine support is a support which can be used in a turbomachine. Moreover, within the meaning of the present disclosure, the insert extends overall along an axis. The axial direction corresponds to the direction of the axis of the insert and a radial direction is a direction perpendicular to this axis and crossing this axis. Likewise, an axial plane is a plane containing the axis of the insert and a radial or transverse plane is a plane perpendicular to this axis. A circumference is understood to be a circle belonging to a radial plane, the center of which belongs to the axis of the insert. A tangential or circumferential direction is a direction tangent to a circumference; it is perpendicular to the axis of the insert but does not pass through the axis.

Unless the contrary is stated, in this context the adjectives inner and outer are used with reference to a radial direction so that the inner portion of an element is, in a radial direction, closer to the axis of the insert than the outer portion of the same element.

The socket may be configured to receive an attachment member. In these cases, the attachment member may be integral with the socket and/or formed permanently with the socket. The attachment member may also be separate from the socket. The attachment member, possibly integrated with the socket, allows the attachment of the component to the support via the insert and more particularly via the socket.

The insert may be assembled directly or indirectly to the component and to the support. According to one example, the insert may be assembled directly to the component, embedded for example in the component, or assembled indirectly to the support, for example by means of the attachment member. According to one variant, the component and the support may be interchanged in the preceding example.

In the insert as previously defined, the first and second walls of the socket form a double wall which may be deformed, particularly due to the free end of the second wall. Thus, the relative deformation of the first and second walls absorbs the differential deformations between the component and the support, which reduces the mechanical loading induced by the support (or vice versa). The insert also reinforces the attachment zone between the component and the support. It is therefore possible to provide, for the component, a weaker material than in the prior art because, due to the insert, the mechanical loading of the component as such is attenuated.

For example, in the case of an aircraft turbomachine, such an insert, assembled to an OGV made of composite material, is therefore capable of ensuring the strength of the OGV in response to displacements imposed by the casing on which the OGV is fixed, said casing forming a turbomachine support.

In some embodiments, the socket comprises at least two sections, with substantial axial symmetry and with different outside diameters, the sections being assembled together in an axial direction of the socket. The axis of symmetry of the two sections is preferably the axis of the socket, preferably identical with the axis of the insert. The result is better axial integration of the insert into the component and/or the support.

In some embodiments, the socket comprises a tapped inner portion and the attachment member comprises a threaded rod. The attachment between the component and the support can therefore be disassembled. Alternatively, the attachment member may form an attachment that cannot be disassembled and may be, for example, a rivet, a pin, a snap-fitting member, etc.

In some embodiments, the second wall is at a distance from the first wall. Thus, a volume is provided between the second wall and the first wall. This feature is to be understood in the initial state of the insert, prior to deformation. The second wall therefore has greater liberty to move relative to the first wall, which makes the insert more effective for absorbing a large range of deformations.

In some embodiments, the first and second walls face one another in a transverse direction. In other words, the respective axial positions of the first and second wall overlap, or possibly are identical.

In some embodiments, the second wall is tubular. In these embodiments, the second wall may be coaxial with the first wall. The deformation of the second wall can therefore occur effectively in all radial directions.

In some embodiments, the insert comprises at least one fin protruding transversely from the second wall.

The fin may be a circumferentially delimited flange portion; the fin does not go completely around the socket. The fin may have the general shape of a plate or of a sheet, plane or curved. The fin may extend substantially in a transverse plane.

The fin allows reinforcing the connection between the component and the support in the vicinity of the socket, compensating the possible breakage of the component or of the support by deformation of the fin and displacing the critical zone of the socket toward the distal end of the fin. Thus, due to the fin, the component resists better the displacements which are imposed on it by the support, and vice versa.

Moreover, the second wall may protrude from the fin in an axial direction of the socket. The anchorage of the insert in the component and/or the support is thus better and the insert offers additional possibilities of deformation for absorbing at least in part the imposed displacements between the support and the component.

The second wall may protrude from the fin in the same direction as the first wall.

In some embodiments, the fin has decreasing axial thickness from the socket to its distal end. This allows providing an appropriate transition between the structure of the insert and the structure of the component. According to one example, said thickness may decrease stepwise: in this case, the fin may have at least two fin segments, each with a constant axial thickness, the thickness of each fin segment being strictly less than the thickness of the adjoining fin segment on the socket side.

In some embodiments, the insert comprises at least two fins. The fins may be identical or similar, in particular as previously described. A second wall may protrude from each of the fins.

In some embodiments, in transverse cross-section, the fin extends circumferentially between two mutually parallel straight lines which define a transverse plane. Thus, the transverse bulk of the socket is limited and the socket may be judiciously oriented so that the fin is effective only in certain directions. Optionally, the fin may extend continuously between said two straight lines. Optionally, the fin may occupy the entire interval between said two straight lines.

In some embodiments, the insert is made of metal. This term encompasses metal alloys.

In some embodiments, a fillet is provided between the first wall and the second wall, at the first end of the second wall. The fillet facilitates the deformation of the second wall relative to the first wall, which makes the insert even more effective for absorbing the relative displacements of the component and of the support.

In some embodiments, the socket comprises a base from which a first tubular wall protrudes axially, a fillet being provided between the first wall and the base. The fillet, provided at the junction of the base and of the first wall, facilitates the deformation of the first wall relative to the base, which makes the insert even more effective for absorbing the relative displacements of the component and of the support.

The present disclosure also relates to an assembly for turbomachines comprising a component and an insert as previously described, the insert being assembled to the component.

In some embodiments, the component made of composite material having a fibrous reinforcement in the form of plies, and the fin is retained, on either side in the axial direction, between certain of said plies. Thus, the insert is integrated in the component and the fin allows good anchorage of the insert in the component. This translates into a better distribution of forces within the component in the event of an incident, therefore into a reduction of the stresses to which the component is subjected.

In some embodiments, the insert is provided on one side of the component and the fin extends toward an opposite side of the component. The fin is therefore directed toward the inside of the component and allows better accommodation of the displacement between the support, where the displacements are imposed, and the interior of the component which, as such, can poorly resist the imposed displacements.

In some embodiments, the component is a turbomachine vane. The component may be an OGV. Thus, according to one example, the insert may form an attachment interface between and OGV made of composite material and a metal casing, the insert accommodating, by its deformation and in particular the deformation of the fin, the displacements imposed by the casing, which the OGV could not resist otherwise.

In some embodiments, the vane comprises at least one platform and an airfoil extending from the platform, and the insert is housed in the platform. Thus, the attachment of the insert to the turbomachine support, generally a casing, is easy.

The platform is preferably made in a single piece with the airfoil. More particularly, when the fin is retained, on either side in an axial direction, between certain plies of the composite vane, said plies preferably extend continuously from the platform to the airfoil. Thus, the distribution of stresses in the vane is optimal.

Alternatively, the component may be a protection panel, made for example of composite material, an acoustic panel for example.

The present disclosure also relates to an assembly comprising a turbomachine support and an insert as previously described, assembled to the support. This assembly may have all or part of the features described previously with reference to the assembly comprising the component and the insert, mutatis mutandis.

BRIEF DESCRIPTION OF THE DRAWINGS

The invention and its advantages will be better understood upon reading the detailed description that follows, of embodiments of the invention given by way of non-limiting examples. This description refers to the appended drawings, in which.

DETAILED DESCRIPTION OF THE INVENTION

One embodiment of a method of manufacture of a turbomachine airfoil will be described with reference to FIGS. 1 to 5.

Optionally, for the purpose of said method, it is possible to supply at least one stiffener, in particular a leading edge stiffener 10. One example of a stiffener of this type is shown, in cross-section in FIG. 1. In this embodiment, the stiffener 10 may comprise a fibrous preform 12 coiled over itself, so as to form a tube. The fibrous preform 12 comprises, in this embodiment, a single one-layer sheet of fibers, i.e. a single two-dimensional ply here. The fibers may be carbon fibers. The ply is preferably a woven ply. The fibrous preform 12 may be pre-impregnated, for example with a matrix made of polymer resin, for example of epoxy, polyester, bismaleimide, polyimide, etc. resin. The length of the stiffener 10 may be substantially equal to the desired length of the airfoil to be manufactured.

Moreover, for the purpose of said manufacturing method, a reinforcing structure is supplied. The manufacture of a reinforcing structure according to one embodiment is illustrated schematically in FIGS. 2A to 2D.

Figure 1:
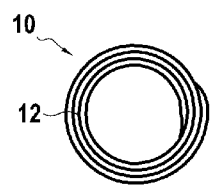
FIG. 1 shows a stiffener shown in cross-section, according to one embodiment.
Figure 2A:
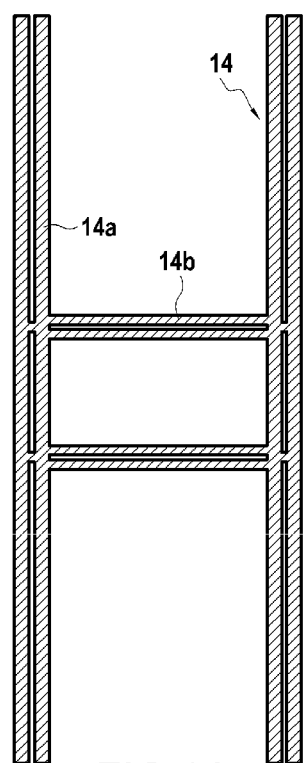
FIGS. 2A to 2D show schematically the manufacture of a reinforcing structure according to one embodiment.

In this embodiment, the reinforcing structure 18 comprises a frame 14, for example of the type shown in FIG. 2A. In this example, the frame 14 comprises two pairs of uprights 14a, the pairs of uprights 14a being interconnected, transversely here, by two pairs of cross-members 14b. Within each pair, the uprights 14a (respectively the cross-members 14b) are adjacent. The pairs of uprights 14a are mutually parallel here. Each pair could be replaced by a single upright or a single cross-member, respectively, or more uprights and cross-members, respectively. Either way, in this embodiment, the frame 14 has the general shape of an H. The H-shaped structure makes the frame 14 resistant to so-called "in plane" deformations, particularly to compression, tension or bending loads in the plane defined by the H, and relatively less resistant to so-called "out of plane" deformations, particularly to torsion or bending loads which tend to cause the frame 14 to leave its original plane. Thus, even if the airfoil has a twisted shape, the frame 14 can be disposed in the airfoil with no particular effort.

The frame 14 itself is formed from a composite material, for example in the form of one or more sheets each comprising a coiled ply, or several superimposed and coiled plies. The structure and/or the composition of the frame 14 may be that of the composite materials already mentioned. In this condition, the frame 14 is rigid, which may result for example from prior treatments or baking. The length of the frame 14, in particular of the uprights 14a, may be substantially equal to the desired length of the airfoil to be manufactured, in its final state. However, to facilitate the insertion of the reinforcing structure 18 in the case where the airfoil is previously formed, it may be preferable to provide a frame 14 length at least twice as high as the length of the airfoil; in this manner, the uprights 14a may be inserted into the airfoil until they extend outward on the other side, then pulled to allow the insertion of the useful portion of the reinforcing structure 18, the portions in excess being ultimately withdrawn. In fact, the inventors have discovered experimentally that the fact of positioning the reinforcing structure 18 by pulling and not by pushing damaged said structure less.

Figure 2B:
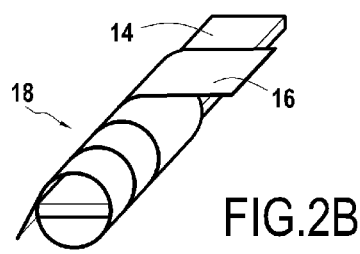

As illustrated in FIG. 2B, the reinforcing structure 18 comprises at least one fibrous preform 16 coiled around the frame 14, in particular coiled around each upright 14*a* and each cross-member 14*b*. The reinforcing structure 18 may comprise as many fibrous preforms as uprights 14*a* and cross-members 14*b*. The fibrous preform 16 comprises, in this embodiment, a single one-layer sheet of fibers, i.e. a single ply as well. The fibers may be carbon fibers. The ply is preferably a woven ply. The fibrous preform 16 may be pre-impregnated, for example with a matrix made of polymer resin.

Figure 2C:
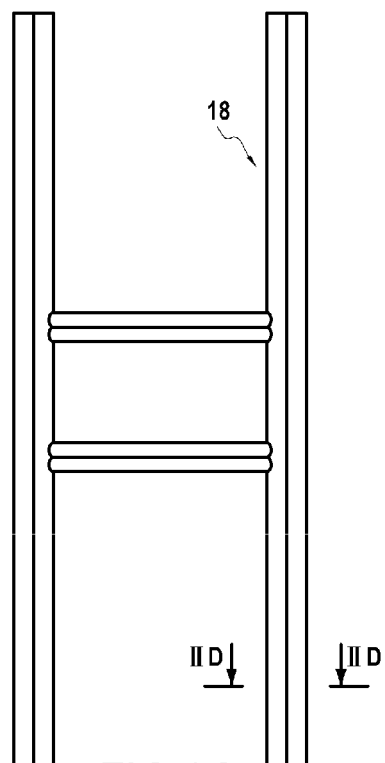
Figure 2D:
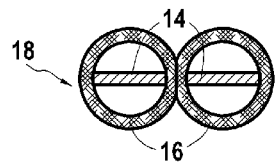

The coiling of at least one fibrous preform 16 around the frame 14 allows obtaining the reinforcing structure 18 illustrated in front view in FIG. 2C, and in cross-section in the plane IID-IID in FIG. 2D.

The steps of a manufacturing method of an airfoil according to one embodiment are now detailed more particularly with reference to FIGS. 3A to 3D.

Figure 3A:
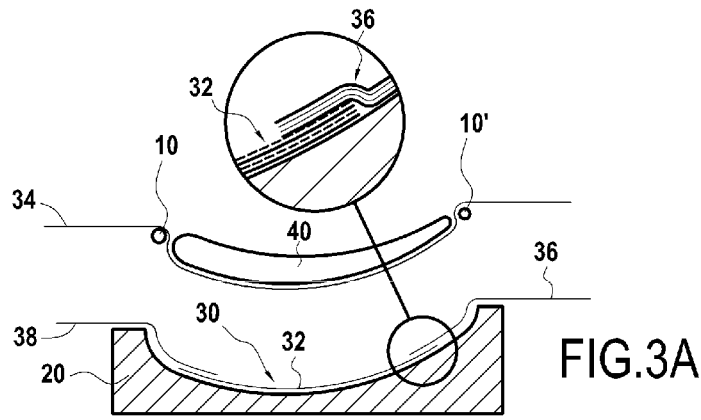
FIGS. 3A to 3D illustrate, schematically and in cross-section, the steps of a manufacturing method of an airfoil according to one embodiment.

As can be seen in FIG. 3A, a first mold portion 20 is supplied, on which a first wall preform 30 is disposed. If needed, the first mold portion 20 may be lubricated beforehand. The first wall preform 30 is a fibrous preform. In this embodiment, the first wall preform 30 is intended to form the suction side wall 30' of the airfoil. The first wall preform 30 comprises a suction side fiber sheet 32. The suction side fiber sheet 32 may be a pre-impregnated sheet comprising fibers, for example carbon fibers, coated with a matrix, for example a polymer resin.

Before the suction side fiber sheet 32 or, as illustrated in FIG. 3A, after it, a leading edge fiber sheet 34 and a trailing edge fiber sheet 36 are also positioned on the leading edge and trailing edge side of the first mold portion 20. The leading edge and trailing edge sheets 34, 36, may have identical or similar composition and structure to the suction side fiber sheet 32. In addition, as revealed by FIG. 3A, the suction side 32 and leading edge 34 fiber sheets overlap. Independently, the suction side 32 and trailing edge 36 fiber sheets also overlap. The overlap zones locally improve the resistance of the airfoil and the continuity between the sheets.

Thus, the first wall preform 30 comprises, in addition to the suction side fiber sheet 32, a first portion of the leading edge fiber sheet 34 and a first portion of the trailing edge fiber sheet 36. As illustrated in FIG. 3A, a second portion of said sheets extends beyond the indentation of the airfoil in the first mold portion 20.

An example of a structure for the first wall preform 30 is shown in the detail of FIG. 3A. In this example, the suction side fiber sheet 32 comprises four plies, produced here using a two-dimensional weave of the twill type and the orientation of which is alternatively offset by 45° by from one ply to another, as revealed by the alternating pattern in the detail of FIG. 3A. Independently, in this example, the leading edge fiber sheet 34 and the trailing edge fiber sheet 36 are identical in their structure. In this particular case, each of these sheets 34, 36 comprises four plies, more precisely two twill type sheets, with their orientation offset by 45°, sandwiching two unidirectional sheets. The suction side fiber sheet 32 and the leading edge and trailing edge fiber sheets 34, 36 overlap so that the twill type ply of the leading edge and trailing edge fiber sheets 34, 36 are in contact with a twill type ply of the suction side fiber sheet 32 having a different orientation. However, other structures may be employed.

To improve the precision and the repeatability of the method, the first wall preform 30 and/or each of the sheets which compose it may be positioned on the first mold portion 20 in conformity with locators or marks previously provided on the first mold portion 20.

A core 40 is then placed on the first wall preform 30. The core 40 is intended to give the airfoil its inner shape. As previously indicated, the core may be an inflatable core capable of exerting a predetermined counter-pressure on the inside of the airfoil during its manufacture. The core 40 may be inflated using any fluid, typically air, water or oil. At this stage, the core 40 is preferably already formed (inflated for example) substantially into its proper shape during hardening treatment, so as to avoid having a subsequent shape change displace the fiber sheets.

Figure 3B:
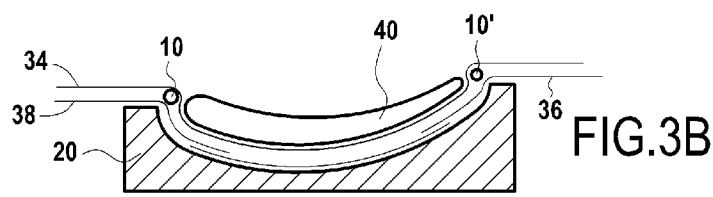
Figure 3C:
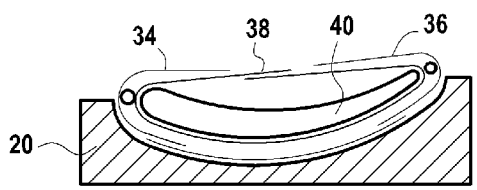

To facilitate its withdrawal, the core 40 may be lubricated or, as illustrated in FIG. 3B, equipped with an anti-adhesion film 38. As can be seen in FIGS. 3B and 3C, the anti-adhesion film is, in this example, positioned flat below the core 40, then subsequently folded over the core 40, after the core 40 has been placed on the first wall preform 30. It is however possible to surround the core 40 with the anti-adhesive film 38 in advance, before positioning the core 40 on the first wall preform 30.

If appropriate, a leading edge stiffener 10 and/or a trailing edge stiffener 10', particularly as described previously, may be positioned on the first wall preform 30, respectively at the leading edge and at the trailing edge. More precisely, the leading edge stiffener 10 is positioned on the leading edge fiber sheet 34 and the trailing edge stiffener 10' on the trailing edge fiber sheet 36. The trailing edge stiffener 10' may be similar or identical to the leading edge stiffener 10, and have all or part of the properties detailed with reference to the leading edge stiffener 10.

The stiffeners 10, 10' may be positioned on the first wall preform before, simultaneously with or after the core 40. In the present embodiment, due to the presence of the anti-adhesive film 38, it is simpler to position first the stiffeners 10, 10', then the anti-adhesive film 38, and finally the core 40, as shown by FIG. 3B.

Then, as indicated previously and as illustrated in FIG. 3C, the anti-adhesive film is folded over the core 40. As revealed by FIG. 3C, the anti-adhesive film 38 surrounds the core 40.

A second wall preform 44 is then positioned on the core 40. The second wall preform 44 is a fibrous preform. In this embodiment, the second wall preform 44 is intended to form the pressure side wall 44' of the airfoil.

In this embodiment, the second wall preform 44 comprises a second portion of the aforementioned leading edge and trailing edge fiber sheets 34, 36. Thus, the fact of positioning a second wall preform 44 on the core 40 comprises the fact of folding the second portion of the leading edge and trailing edge fiber sheets 34, 36 which extended beyond the indentation of the airfoil on the first mold portion 20, onto the core 40. As can be seen in FIG. 3C, the leading edge and trailing edge fiber sheets 34, 36 are folded, respectively, around the leading edge and trailing edge stiffeners 10, 10'.

Thus the leading edge and trailing edge fiber sheets 34, 36 form, at the intersection between the first and second wall preforms 30, 44, respectively the leading edge and the trailing edge of the airfoil.

Again, for the sake of precision and repeatability of the method, it may be ensured that the leading edge and trailing edge fiber sheets 34, 36 are folded at locators or marks previously provided on the first mold portion 20.

In addition, in particular in the case where the second portions of the leading edge and trailing edge fiber sheets 34, 36 are not in contact with one another, the second wall preform 44 may comprise a pressure side fiber sheet 42. The pressure side fiber sheet 42 may have an identical or similar structure to the suction side fiber sheet 32. The pressure side fiber sheet 42 may be positioned between the core 40 and the second portions of the leading edge and trailing edge fiber sheets 34, 36 or, as illustrated in FIG. 3D, outside the leading edge and trailing edge fiber sheets 34, 36.

Marks, locators and/or a jig may be used to ensure the correct positioning of the pressure side fiber sheet 42.

Fibrous composites are generally anisotropic. Thus, in the steps previously described, the orientation of the fiber sheets and/or of the preforms may be selected so that said sheets and/or preforms have increased resistance in the directions that are calculated or known as having the greatest mechanical loading. For example, fibers may be oriented parallel to maximum loads. The sheets and/or preforms may then be fabricated or cut to the desired shape, taking into account their predetermined respective orientations.

Figure 3D:
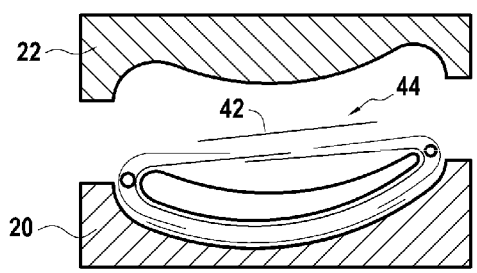

As illustrated in FIG. 3D, a second mold portion 22 is assembled to the first mold portion 20 so as to form a mold around the first and second wall preforms 30, 44. If needed, the second mold portion 22 may be lubricated in advance. A hardening treatment of the first and second wall preforms 30, 44 is then undertaken, in this case by means of an autoclave. As indicated previously, this hardening treatment may be a baking treatment of the matrix of the pre-impregnated preforms or, if the preforms are not pre-impregnated, an injection treatment.

Once the hardening treatment is carried out, the core 40 is removed. In the case of an inflatable core, this may be accomplished by deflating and removing the core 40 and, if appropriate, the anti-adhesion film 38. Alternatively, in particular for other types of core, the core may be destroyed in place in a manner known per se, particularly by means of a chemical treatment.

The reinforcing structure 18 previously describe, is then positioned in the hollow airfoil thus obtained, more precisely between the first wall preform 30 and the second wall preform 44. The position of the reinforcing structure 18 may be verified by means of locators or a jig.

A second hardening treatment is applied to harden the reinforcing structure 18. The second hardening treatment may be similar to the first hardening treatment.

Figure 4:
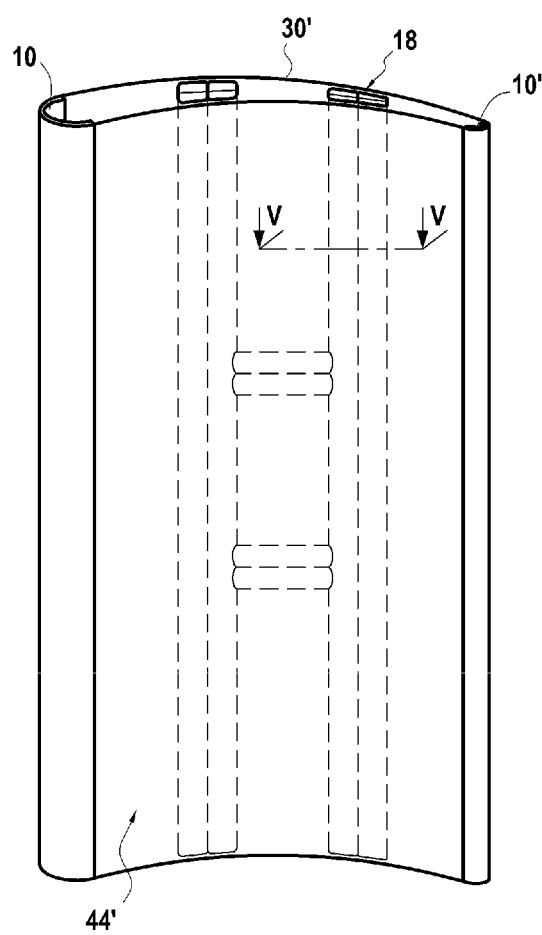
FIG. 4 illustrates, in perspective and schematically, an airfoil according to one embodiment.

The airfoil obtained is shown schematically, in perspective, in FIG. 4. As this figure shows, the airfoil is a composite airfoil comprising a first wall 30' (suction side wall) having a fibrous reinforcement, obtained from the first wall preform 30, a second wall 44' (pressure side wall) having a fibrous reinforcement, obtained from the second wall preform 44, and a reinforcing structure 18 positioned between the first wall 30' and the second wall 44'.

In addition, in this embodiment, the airfoil comprises a leading edge stiffener 10 and a trailing edge stiffener 10', at the intersection between the first wall 30' and the second wall 44'. As can be seen in FIG. 4, the leading edge stiffener 10 and the trailing edge stiffener 10' no longer have a circular shape, but rather have an arched shape. This deformation is due to the pressure of the mold and to the counter-pressure applied by the core 40 during the first hardening treatment.

Figure 5:
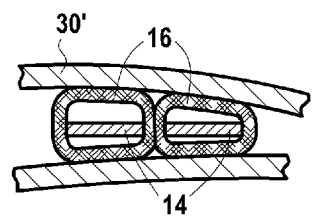
FIG. 5 is a cross-section view in the plane V-V of FIG. 4.

FIG. 5 shows in cross-section the reinforcing structure 18 integrated between the first and the second wall 30', 44'. As can be seen in this figure, after the reinforcing structure 18 has been subjected to any of the hardening treatments, in this case the second hardening treatment, the reinforcing structure 18 is in contact with the first wall 30' and/or the second wall 44', in this case with both of these walls. Indeed, besides hardening the reinforcing structure 18, the second hardening treatment may allow linking the matrix of the reinforcing structure 18 to matrix of the first wall preform 30 and/or of the second wall preform 44. In addition, like the stiffeners 10, 10', a change of shape of the reinforcing structure 18 is noted, in particular of the fibrous preform 16, for adapting itself to the volume available inside the airfoil.

Alternatively, it would be possible, possibly by using several cores, to position the reinforcing structure 18 between the first and the second wall preforms 30, 44 at the same time as the core(s), in the step shown in FIG. 3B. In these embodiments, a single hardening treatment may be necessary, the reinforcing structure 18 being hardened and linked to the airfoil at the same time that the airfoil itself is hardened.

Although one embodiment has been detailed by following a particular order in the steps, a manufacturing process of an airfoil as defined by the claims may be implemented in a different order, it being understood that it is possible to modify the order of the steps according to all technically practicable combinations.

The embodiment described comprises carbon fibers in different portions of the airfoil. However, for one or more portions of the airfoil, independently of the other portions, the fibers may be glass, aramid, boron, polyethylene fibers, ceramic fibers, etc.

The embodiment described comprises a polymer matrix, in particular of the epoxy type. However, for one or more portions of the airfoil, independently of the other portions, other materials may be used for the matrix, for example thermosetting polymers, such as polyester, bismaleimide, polyimide, etc., or thermoplastic polymers such as polycarbonate, etc.

Figure 6:
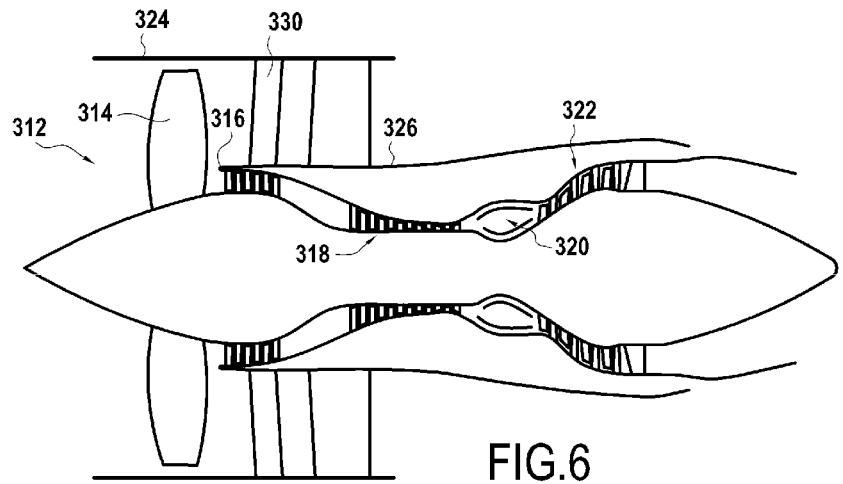
FIG. 6 shows a schematic cross-section view of a turbomachine.

The airfoil previously described may be used in a turbomachine of which the overall architecture will be described with reference to FIG. 6, which shows an axial cross-section of a turbomachine 312. Upstream, the turbomachine 312 comprises a fan 314 for air intake. At the outlet of the fan 314, the flow of air separates into two portions. A first portion of the air flow is sent to a low-pressure compressor 316, then a high-pressure compressor 318. This first portion of the air flow is then injected into a combustion chamber 320, at the outlet of which it drives a turbine 322. A second portion of the air flow, at the outlet of the fan 314, is sent, between an outer casing 324 and an inner casing 326, to a straightener comprising vanes 330 to be straightened, then mixed with the gases leaving the turbine 322. The second portion of the air flow may serve, in part, for cooling the turbomachine 312.

Figure 7:
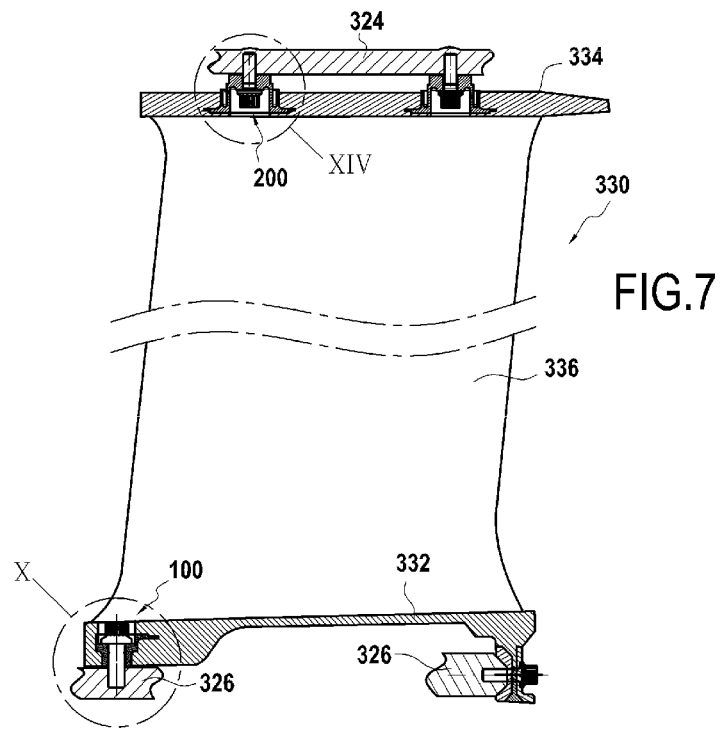
FIG. 7 shows, in an axial cross-section of the turbomachine, an OGV attached to a casing according to one embodiment.

As illustrated in more detail in FIG. 7, a straightener vane 330, here an outlet guide vane or OGV 330, forming one example of a component within the meaning of the present disclosure, is attached to the outer casing 324 and to the inner casing 326, each of these casing forming an example of a turbomachine support, or simply a support, within the meaning of the present disclosure.

In this case, the OGV 330 comprises at least one platform, here two platforms 332, 334, and an airfoil 336 extending between the two platforms. The platforms 332, 334 delimit, in a radial direction of the turbomachine, an air passage called a cooling stream or a secondary stream, by opposition to the primary stream which feeds the combustion chamber 320 (see FIG. 6). The airfoil 336 may be the airfoil previously described with reference to FIGS. 1 to 5.

In this embodiment, the OGV 330 is made of a composite material having a fibrous reinforcement in the form of plies, embedded in a matrix. The fibrous reinforcement may comprise glass, carbon, aramid or ceramic fibers, etc. Moreover, the matrix may comprise a resin, for example an epoxy, polyester, bismaleimide or polyimide resin, etc. Preferably, the plies forming the platforms extend continuously from one platform 332 to the other platform 334, via the airfoil 336.

At least one first insert 100 is used for the attachment of the OGV 330 to the inner casing 326. Here the first insert 100 is housed in the platform 332. This attachment will be detailed with reference to FIGS. 7 to 11. Moreover, independently, at least one second insert 200, in this case two second inserts 200, are used for the attachment of the OGV 330 to the outer casing 324. Alternatively, three or four second inserts 200 may be used for the attachment of the OGV 330 to the outer casing 324. Here the second insert 200 is housed in the platform 334. This attachment will be detailed with reference to FIGS. 12 to 15D.

Unless the contrary is stated, hereafter the first and second inserts 100, 200 are described in their initial and nominal state, i.e. in their state during initial assembly with the OGV 330 and the casing 324, 326, prior to any possible deformation.

Figure 8:
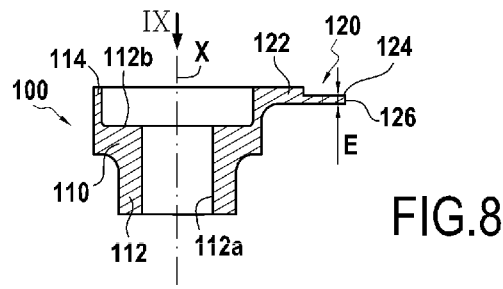
FIG. 8 is an axial cross-section view of a first insert according to one embodiment.

One embodiment of the first insert 100 is illustrated in FIGS. 8 to 11. The first insert comprises a socket 110 and at least one fin 120 protruding transversely from the socket 110. Here, the socket defines an axial direction X and the fin 120 protrudes in a radial or transverse direction R. More precisely, as revealed by FIGS. 8 and 9, the fin 120 protrudes substantially in a transverse plane orthogonal to the axial direction X. As illustrated in FIG. 8, the first insert 100 may be made in a single piece.

In this embodiment, the socket 110 has substantial axial symmetry around the axis X. More particularly, the socket 110 comprises a base 112 (first section) from which a first wall 114 (second section) protrudes axially. Thus, the socket comprises at least two sections with substantial axial symmetry, namely the base 112 and the first wall 114, with different outside diameters, the sections being assembled together in an axial direction of the socket 110. In this case, the first wall 114 is tubular, more precisely cylindrical with a circular cross-section, and has an outer diameter greater than the diameter of the base 112. The outer diameter of the first wall 114 may be equal to one and a half times the outer diameter of the base 112.

The base 112 comprises an opening, axial here, the orifice having a tapping 112a. Thus, via the tapping 112a, the socket is configured to receive an attachment member such as a threaded rod 340 (see FIG. 10). The first wall 114 also defines an opening, the inner diameter of which is greater than the diameter of the opening of the base 112. The first wall 114 thus delimits a shoulder 112b of the base 112. The shoulder 112b may act as an abutment for the attachment member 340. The shoulder 112b may be provided more or less close to the free end of the first wall 114.

In this embodiment, as shown in FIG. 8, the fin 120 protrudes from the first wall 114. Here, the fin 120 protrudes transversely from the socket 110 at an axial end of the socket 110 opposite to the base 112. The successively increasing transverse outer diameters of the base 112, of the first wall 114 and of the fin 120 define steps which improve the anchorage of the first insert 100 in the platform 332, more generally in the component that the OGV 330 forms.

It is understood that the fin 120 is delimited in the axial direction X and extends, in this direction, over an axial thickness less than that of the socket 110, more precisely over an axial thickness less than that of the first wall 114.

As can be seen in FIG. 8, the fin 120 has an axial thickness E (thickness in the axial direction X) that decreases from the socket 110 to its distal end 126. In this particular case, the fin 120 comprises a first fin segment 122, situated here level with the free end of the first wall 114 and extending transversely from the first wall 114. The fin 120 also comprises a second fin segment 124, extending transversely from the first fin segment 122. Each of the fin segments 122, 124 has a substantially constant axial thickness E. The axial thickness of the second fin segment 124 is less than the axial thickness of the first fin segment 122 which is situated on the side of the socket 100 relative to the second fin segment 124. This scheme may be repeated by recursion in the case where the fin 120 comprises more than two segments. More generally, the maximum axial thickness of a fin segment may be less than the minimum axial thickness of an adjoining fin segment on the side of the socket 110.

In the present example, the axial thickness of the first fin segment 122 is equal to approximately twice the axial thickness of the second fin segment 124.

Figure 9:
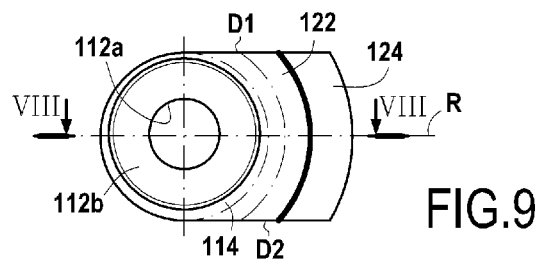
FIG. 9 is a top view of the first insert, in the direction IX of FIG. 8.

As can be seen in FIG. 9, in cross-section, the fin 120 extends circumferentially between two mutually parallel tangents D1, D2 of the socket 110. The tangents D1 and D2 are therefore taken at diametrically opposed points of the socket 110, if the socket 110 is circular in cross-section. The straight lines D1, D2 may be tangent to the socket 110 at its maximum diameter, here the first wall 114.

Figure 10:
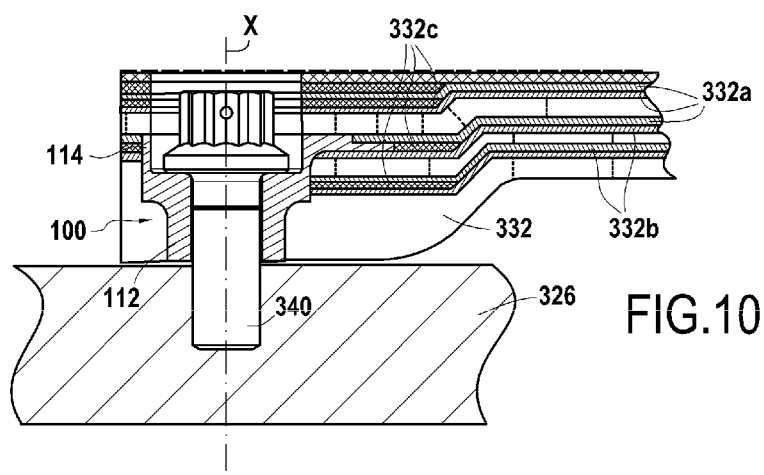
FIG. 10 is a detail view of zone X of FIG. 7 and shows, in axial cross-section, the integration of the first insert.

The assembly of the first insert 100 to the OGV 330 forming a component and to the inner casing 326 forming a support is illustrated in axial cross-section in FIG. 10. As can be seen in this figure, the insert is directly assembled to the OGV 330, as will be detailed hereafter, and indirectly assembled to the inner casing 326, here by means of a threaded rod 340 which engages with the tapping 112a and with a corresponding tapping provided in the inner casing 326, for example.

Regarding the OGV 330, the first insert 100 is housed, or even embedded, in the platform 332. In this case, the platform 332 comes into contact with the radially outer surface of the socket 110. The axially free surface of the base 112 is level with a free surface of the platform 332. Moreover, the axial dimension of the base 112 may be dimensioned more or less long so that the axially free surface of the base 112 is level with the corresponding free surface of the platform 332. Thus, when the assembly is attached, the first insert 100 comes directly into contact with the inner casing 326, which reinforces the attachment, in particular if the first insert 100 and the inner casing 326 are made of similar materials, for example metal or metal alloys.

A hole is provided in the platform 332, in the continuation of the inner diameter of the first tubular wall 114.

Moreover, ply assemblies 332a, 332b, 332c of the fibrous reinforcement of the platform 332 are shown in FIG. 10. The first insert 100 is integrated with the platform 332 by interleaving the fin 120 between the plies of the platform 332. In other words, the fin 120 is retained, on either side in the axial direction X, by certain of said plies.

In this case, the fibrous reinforcement of the platform 332 is formed by a succession of first and second plies 332a, 332b. To form an enlarged portion of the platform 332, third plies 332c may be provided between the first and second plies 332a, 332b. As illustrated in FIG. 10, the fin 120 may be retained on one side by a first ply 332a, on another side by a second ply 332b. The fin 120 may be located in the continuation of a third ply 332c.

As can be seen in FIGS. 7 and 10, the first insert 100 is provided on one side of the component, here on the upstream side of the OGV 330, and the fin 120 extends, in the OGV 330, to an opposite side of the component, here to the downstream side of the OGV 330.

Figure 11:
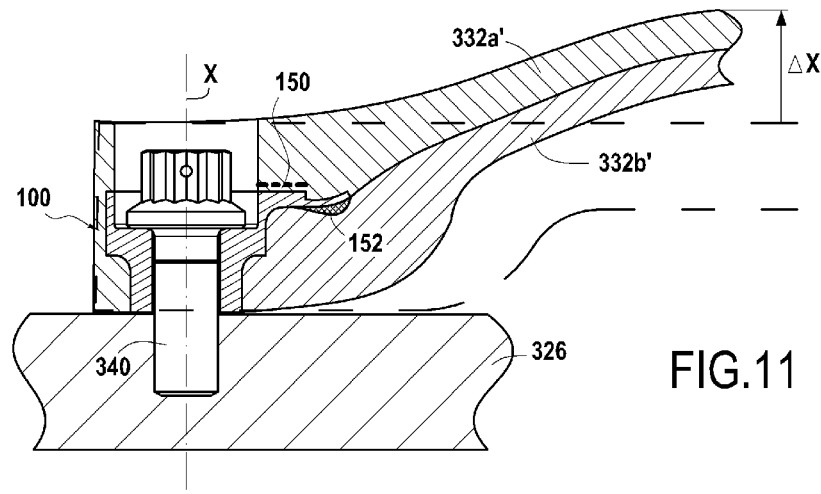
FIG. 11 illustrates schematically an example of deformation of the assembly of FIG. 7, in zone X.

The response of the thus formed assembly to an imposed displacement ΔX of the OGV 330 relative to the inner casing 326 is shown schematically in FIG. 11, in which the initial or nominal position, which is the position of FIG. 10, is shown in dotted lines. In addition, in FIG. 11, the structure of the fibrous reinforcement of the platform 332 has been simplified into a first portion 332a', on one side of the fin 120, and a second portion 332b', on the other side of the fin 120 in the axial direction.

In the event of displacement of the OGV 330 relative to the inner casing 326 along the axis X, in the direction of the OGV 330 moving away from the inner casing 326, which corresponds to a relative displacement in a radial direction of the turbomachine 312, the composite material of the OGV 330 undergoes a local fracture at the free end 126 of the fin (zone 152), but this fracture is compensated by the plastic deformation of the fin 120 in the direction of the displacement ΔX. In fact, the presence of the first insert 100 displaces the critical zone of the attachment from zone 150, near the socket 110 and more particularly near the first wall 114, to zone 152, at the interface between the fin 120 and the plies adjoining the fin 120. However, shear loads are exerted in zone 150, which composite materials resist poorly, while tension-compression loads are exerted in zone 152, which composite materials resist better. The transfer of stresses to a more resistant zone, namely zone 152, substantially improves the strength of the OGV 330. The fin 120 plays the role of a sacrificial part, which preferentially deforms to limit the deformations of the actual OGV 330.

One embodiment of the second insert 200 is illustrated in FIGS. 12 to 15D. In these figures, the corresponding or identical elements with those of the first insert 100 will receive the same reference symbol, with the addition of one hundred, and will not be described again.

Figure 12:
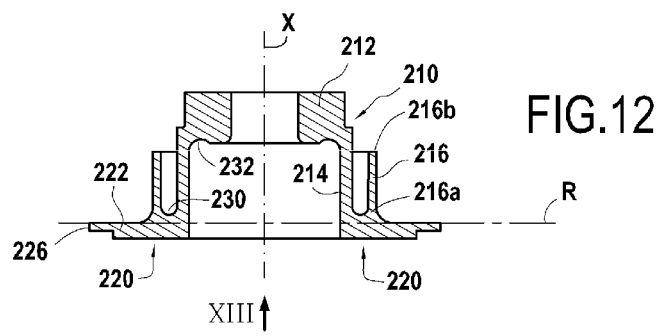
FIG. 12 is an axial cross-section view of a second insert according to one embodiment.

As illustrated in FIG. 12, the second insert 200 comprises the assembly of the elements described with reference to the first insert 100, namely a socket 210, having a base 212 and a first wall 214, and a fin 220. These elements may have all or a part of the features previously described. As illustrated in FIG. 12, the second insert 200 may be made in a single piece.

Moreover, the socket 210 additionally comprises a second wall 216 arranged around at least one portion of the first wall 214, the second wall 216 having a first end 216a connected to the first wall 214 and a free second end 216b, here on the side of the base 212.

In this embodiment, the second wall 216 is at a distance from the first wall 214. More precisely, the first and second walls 214, 216 face each other in a transverse direction R and leave a space between them.

Moreover, the second wall 216 is tubular. In this case, the second wall 216 extends coaxially with the first wall 214, outside the same, around the axis X.

Figure 13:
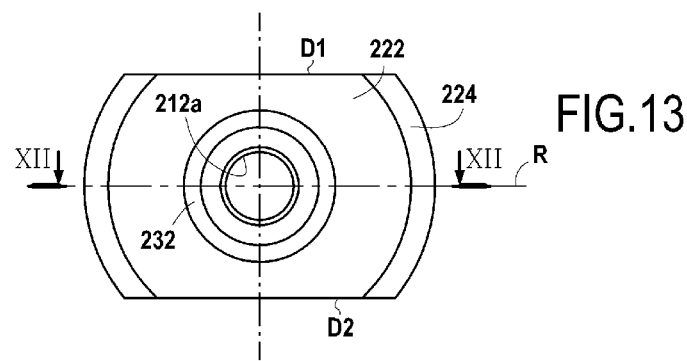
FIG. 13 is a bottom view of the second insert, in the direction XIII of FIG. 12.

As revealed by FIGS. 12 and 13, the second insert may comprise at least two fins, in this case two fins 220. In this embodiment, the two fins 220 are identical, thus what has been said or will be said with reference to one of the fins 220 also applies to the other, unless the contrary is stated. Generally, however, the fins 220 could differ from one another.

In addition, the fins 220 may be distributed circumferentially around the socket 210, regularly or not. In this case, the two fins 220 are diametrically opposed and both extend in the same radial direction R, in opposite directions on either side of the socket 210 (FIG. 13). According to one example, the limit of a fine 220, particularly for distinguishing it from another fin, may be defined by a change of shape of the distal end 226 of the fin 220 in the circumferential direction.

According to the example illustrated in FIG. 13, in cross-section, the fins 220 extend circumferentially between two mutually parallel straight lines D1, D2 and define a transverse plane, in this case the plane of FIG. 13. The straight lines D1, D2 also delimit, in this embodiment, the fins 220. The straight lines D1, D2 may be selected to be farther from the axis X of the socket 212 than the second wall 216, so that the shape of the fins 220 does not interfere with the attachment of the second wall 216 to the fins 220.

In fact, as can be seen in FIG. 12, the second wall 216 protrudes from the fin 220 in the axial direction X of the socket 210. Thus, the first end 216a of the second wall 216 is connected to the first wall 214 via the fin 220, in this case via the first fin segment 222. In other words, as shown in FIG. 12, the second wall 216 protrudes from an intermediate portion of the fin 220. Thus, the free end of the fin 220 extends radially beyond (i.e. outside of) the first wall 216.

In addition, in this case, a fillet 230 is provided between the first wall 214 and the second wall 216, at the first end 216a of the second wall 216. In a corresponding but independent manner, a fillet 232 is provided between the first wall 214 and the base 212 from which the first wall 214 protrudes axially. Each of the fillets 230, 232 may be substantially annular. The utility of these fillets 230, 232 will be highlighted hereafter.

Figure 14:
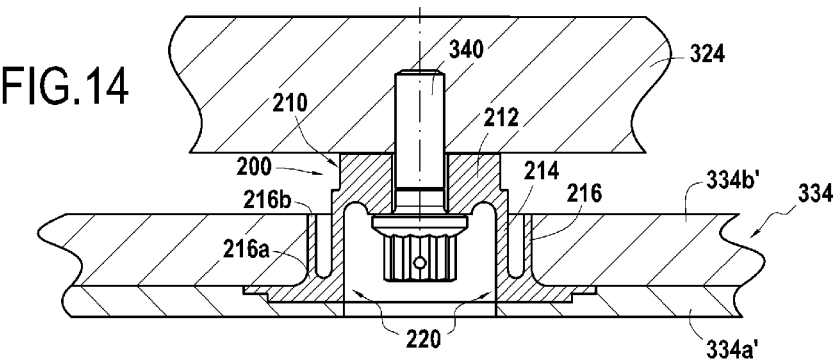
FIG. 14 is a detail view of zone XIV of FIG. 7 and shows, in axial cross-section, the integration of the second insert.

The assembly of the second insert 200 to the OGV 330 forming a component and to the outer casing 324 forming a support is illustrated in axial cross-section in FIG. 14 and may be made, mutatis mutandis, as the assembly of the first insert 100 to the OGV 330 forming a component and to the inner casing 326 forming a support.

As can be seen in FIG. 14, the second insert 200 is directly assembled to the OGV 330 and indirectly assembled to the outer casing 324, here by means of a threaded rod 340 which engages with the tapping 212a and with a corresponding tapping provided in the outer casing 324, for example.

In FIG. 14, the structure of the fibrous reinforcement of the platform 334 has been simplified into a first portion 334a', on one side of the fin 220, and a second portion 334b', on the other side of the fin 220 in the axial direction. Regarding the OGV 330, the second insert 200 is housed in the platform 334. In this particular case, the platform 334 comes into contact with the radially outer surface of the socket 210, in this instance in contact with the second wall 216. The second end 216b of the second wall 216, axially free, is level with a free surface of the platform 334. However, the base 212 extends axially beyond the second wall 216; thus, when the assembly is attached, the second insert 200 comes directly into contact with the casing 324, which reinforces the attachment, in particular if the second insert 200 and the inner casing 324 are made of similar materials, for example metal or metal alloys.

Moreover, a hole is provided in the platform 334, in the extension of the inner diameter of the first tubular wall 214.

As can be seen in FIG. 7, the second insert 200 is arranged in the component, here in the OGV 330, so that the transverse direction R in which the fins 220 extend corresponds to the upstream-downstream direction of the OGV 330.

The response of the assembly thus formed to a displacement imposed by the OGV 330 relative to the outer casing 326 is shown schematically in FIGS. 15A to 15D, each figure pertaining to a different type of displacement. In these figures, the initial or nominal position, which is the position of FIG. 14, is shown in dotted lines.

Figure 15A:
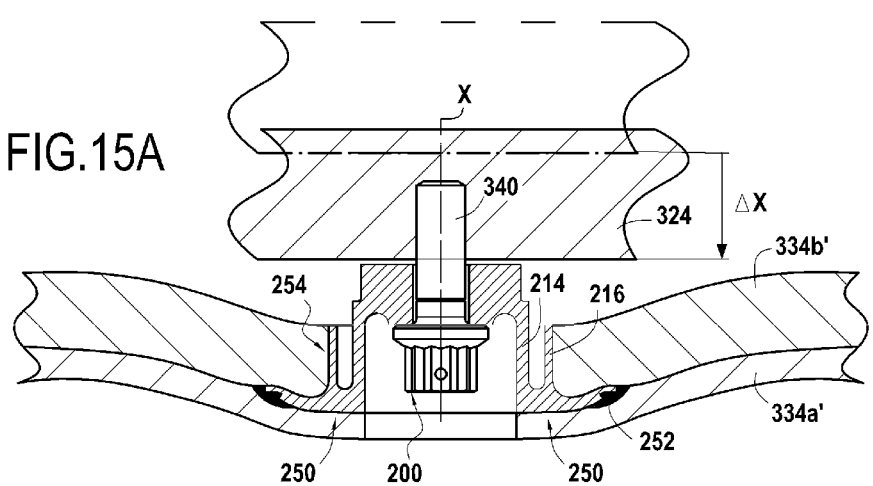
FIGS. 15A-15D illustrate schematically different examples of deformation of the assembly of FIG. 7, in zone XIV.

FIG. 15A deals with the case of an axial displacement ΔX, i.e. in a radial direction of the turbomachine, tending to move the outer casing 324 closer to the OGV 330. In this case, the composite material of the OGV 330 undergoes a local fracture at the free end 226 of the fin (zone 252), but this fracture is compensated by the plastic deformation of the fin 220 in the direction of the displacement ΔX. In fact, the presence of the second insert 200 displaces the critical zone of the attachment from zone 254, along the second wall 216, to zone 252, at the interface between the fin 220 and the plies adjoining the fin 220. However, shear loads are exerted in zone 254, which composite materials resist poorly, while tension-compression loads are exerted in zone 252, which composite materials resist better. The transfer of stresses to a more resistant zone, namely zone 252, reduces substantially the risk of rupture of the OGV 330.

Figure 15B:
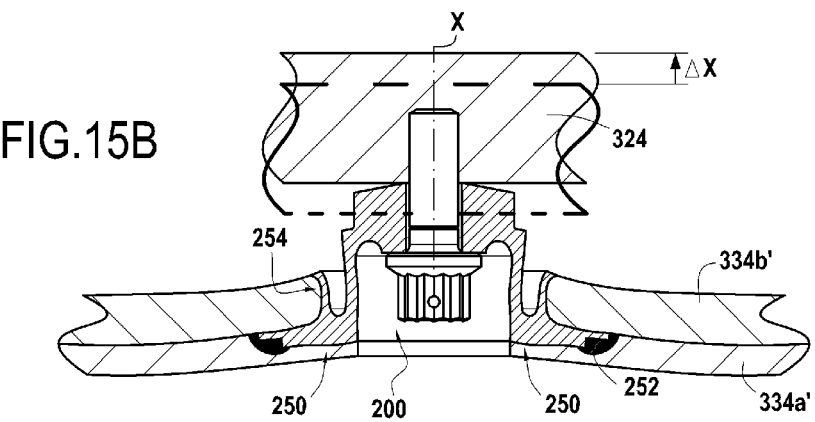

This mechanism also occurs in the case of an axial displacement ΔX in the opposite direction, as illustrated in FIG. 15B. In this case, however, bending of the second wall 216 is also observed, facilitated due to the fillet 230. Precisely, the second end 216b moves away from the first wall 214 so as to limit the deformation of the second portion 334b' of the platform 334, which is contiguous with it. The second wall 216 plays the role of a sacrificial part, which preferentially deforms to limit the deformation of the actual OGV.

Figure 15C:
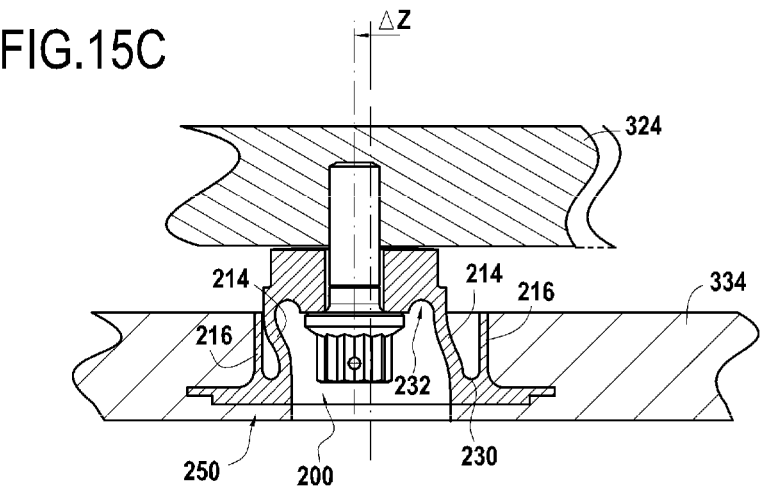
Figure 15D:
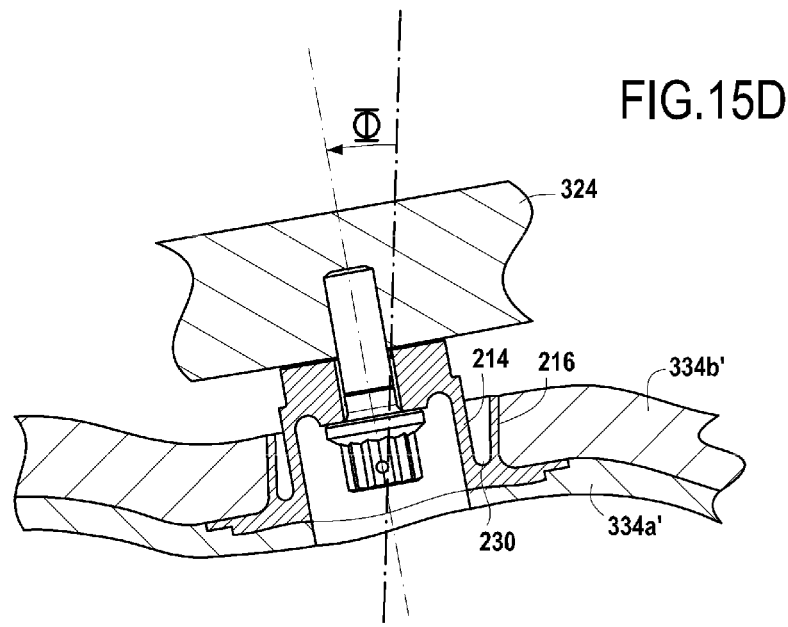

When the imposed relative displacement ΔZ is a translation in an axial direction of the turbomachine 312, here in a radial direction R of the second insert 200, and further in the transverse direction R in which the fins 220 extend, the deformation obtained may be of the type of that shown in FIG. 15C. As can be seen, the first wall 214 bends in the transverse direction R, possibly to the point of assuming an S shape. This bending is facilitated not only by the fillet 230 between the first and second walls 214, 216, but also by the fillet 232 between the first wall 214 and the base 212. This bending reduces the shear stress in a zone 250, in the vicinity of the socket 210 and more particularly of the first wall 214. The first wall 214 plays the role of a sacrificial part, which is preferably deformed to limit the deformation of the actual OGV.

Moreover, as illustrated, the second wall 216 may form an abutment for the bending of the first wall 214 in the direction of the relative displacement Z. The presence of such an abutment is to be taken into account in dimensioning the insert 200, it being understood that if the platform 334 were thinner in the axial direction X, the second wall 216 could be less extended in the axial direction X, and consequently allow more bending of the first wall 214, which could even go beyond the second wall 216.

Finally, when the imposed displacement is a rotation by an angle Φ in an axial plane of the second insert 200, the second insert 200 twists overall, so that the first wall 214 is no longer coaxial with the second wall 216. The first and second walls 214, 216 play the role of sacrificial parts, which deform preferentially to limit the deformation of the actual OGV. In this particular case, the first wall 214 follows the rotation imposed by the outer casing 324 while the second wall 216 remains, to a certain degree, closer to its initial orientation. A relative offset of the first and second walls 214, 216 is facilitated by the fillet 230 and limits the impact of the rotation on the first and second portions 34a', 34b' of the platform 334.

Although one embodiment has been presented in which a first insert 100 and a second insert 200 are assembled to the OGV 330, only one of said inserts may be provided. As disclosed previously, the presence of a single one of said inserts 100, 200 already considerably reinforces the strength of the OGV in the event of an imposed relative displacement relative to the casing 324, 326.

As a result, the use of the first and/or the second insert allows accommodating differential displacement having an order of magnitude of some ten millimeters without rupture, while an identical OGV without such an insert formerly resisted only displacements having an order of magnitude of a millimeter.

In the case of use as an interface between an OGV and a turbomachine casing, the first and second inserts 100, 200 may be made of metal or of metal alloy, for example Ti6Al4V. More generally, the materials of the first and second inserts 100, 200 may have all or part of the following features:

Young's modulus greater than or equal to 73 gigaPascals (GPa), preferably greater than or equal to 105 GPa;

mass density comprised between 2800 and 8200 kilograms per cubic meter ($kg/m^3$);

ultimate tensile stress greater than or equal to 500 megaPascals (MPa);

specific strength (ratio of strength to mass density) greater than or equal to 0.145 MPa·$m^3$/kg, preferably greater than or equal to 0.2 MPa·$m^3$/kg;

specific elongation to tensile rupture greater than or equal to 14%;

thermal dilation coefficient of the same order of magnitude as the thermal dilation coefficient of the component (here, of the OGV 330), i.e. multiplied or divided at most by a factor of 10, which allow reducing the clearance and the thermal stresses between the insert and the component. According to one example, the thermal dilation coefficient may be less than or equal to $10 \times 10^{-6}$/° C., the thermal dilation coefficient of the component generally being small.

The attachment of an OGV 330, forming a component, to a turbomachine casing 324, 326, forming a support, is only one example of implementation of the first and second inserts 100, 200. In particular, the role and the features of the support and the component may be interchanged.

More generally, although the present invention has been described by referring to specific embodiments, modifications can be applied to these examples without departing from the general scope of the invention as defined by the claims. In particular, individual characteristics of the different embodiments illustrated/mentioned may be combined in additional embodiments. Consequently, the description and the drawings should be considered in an illustrative, rather than a restrictive sense.

The invention claimed is:

1. An airfoil manufacturing method for manufacturing an aircraft turbomachine airfoil, comprising:
    positioning a first fibrous wall preform on a first mold portion;
    placing at least one core on the first wall preform;
    positioning a second fibrous wall preform on the core;
    assembling a second mold portion to the first mold portion so as to form a mold around the first and second wall preforms;

applying a hardening treatment to the first and second wall preforms;

removing the core;

positioning a reinforcing structure between the first wall preform and the second wall preform, wherein the reinforcing structure comprises a frame formed from a composite material, and wherein a fibrous preform is coiled around the frame; and applying a second hardening treatment to harden the reinforcing structure, wherein after the second hardening treatment, the reinforcing structure is in contact with at least one of a first wall formed from the first wall preform and a second wall formed from the second wall preform, wherein the first wall preform comprises a first portion of a fiber sheet, the second wall preform comprises a second portion of the same fiber sheet, said fiber sheet forming, at the intersection between the first and second wall preforms, the leading edge or the trailing edge of the airfoil.

2. The airfoil manufacturing method according to claim 1, comprising inserting at least one of a leading edge stiffener and a trailing edge stiffener before applying the hardening treatment.

3. The airfoil manufacturing method according to claim 2, wherein the at least one of the leading edge stiffener and the trailing edge stiffener comprises, before applying the hardening treatment, a coiled fibrous preform, optionally wherein the coiled fibrous preform includes one or more sheets.

4. The airfoil manufacturing method according to claim 2, wherein the length of at least one of the leading edge stiffener or trailing edge stiffener is substantially equal to the desired length of the airfoil to be manufactured.

5. The airfoil manufacturing method according to claim 1, wherein the reinforcing structure is arranged between the first wall preform and the second wall preform after application of the hardening treatment.

6. The airfoil manufacturing method according to claim 5, wherein, before the reinforcing structure is subjected to the second hardening treatment, the reinforcing structure comprises a coiled fibrous preform.

7. The airfoil manufacturing method according to claim 5, wherein the reinforcing structure is arranged at a distance from the leading edge and/or trailing edge.

8. The airfoil manufacturing method according to claim 1, wherein, after the reinforcing structure has been subjected to the hardening treatment, the reinforcing structure is in contact with at least one of a first wall formed from the first wall preform and a second wall formed from the second wall preform.

9. The airfoil manufacturing method according to claim 1, wherein at least one of the first wall preform and the second wall preform comprises a plurality of mutually overlapping fiber sheets.

10. The airfoil manufacturing method according to claim 1, wherein at least one wall of first wall preform or second wall preform is impregnated to form a composite material.

11. The airfoil manufacturing method according to claim 1, wherein the core is a fixed shape or an adaptable shape.

12. The airfoil manufacturing method according to claim 11, wherein the core includes an anti-adhesion film or wherein the core is lubricated.

13. The airfoil manufacturing method according to claim 1, wherein the increase in temperature includes a heat treatment.

14. The airfoil manufacturing method according to claim 1, wherein applying the second hardening treatment is applied after positioning the reinforcing structure between the first wall preform and the second wall preform.

15. The airfoil manufacturing method according to claim 1, wherein the aircraft turbomachine airfoil includes at least one platform and an airfoil extending from the at least one platform, optionally wherein the aircraft turbomachine airfoil is an outlet guide vane.

16. The airfoil manufacturing method according to claim 1, wherein the reinforcing structure comprises a frame having at least two uprights transversely interconnected by at least two cross-members.

17. The airfoil manufacturing method according to claim 1, wherein the reinforcing structure comprises a frame having at least one upright arranged at a leading edge side of the airfoil and at least one upright arranged at a trailing edge side of the airfoil.

18. A composite aircraft turbomachine airfoil, comprising a first wall having a fibrous reinforcement, a second wall having a fibrous reinforcement, and a reinforcing structure positioned between the first wall and the second wall, wherein the reinforcing structure comprises a frame formed from a composite material, and wherein a fibrous preform is coiled around the frame, wherein the first wall comprises a first portion of a fiber sheet, the second wall comprises a second portion of the same fiber sheet, said fiber sheet forming, at the intersection between the first and second walls, the leading edge or the trailing edge of the airfoil.

19. The composite aircraft turbomachine airfoil according to claim 18, comprising at least one of a leading edge stiffener and a trailing edge stiffener at an intersection between the first wall and the second wall.

* * * * *